United States Patent
Choi et al.

(10) Patent No.: US 7,133,112 B1
(45) Date of Patent: Nov. 7, 2006

(54) METHOD OF MANUFACTURING A LIQUID CRYSTAL DISPLAY DEVICE WITH COMPENSATION FOR ANGLE BETWEEN DIRECTOR AND ALIGNMENT DIRECTION

(75) Inventors: Young Seok Choi, Taejon-shi (KR); Ji Young Ahn, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/572,378

(22) Filed: May 18, 2000

(30) Foreign Application Priority Data

May 18, 1999 (KR) .............................. P1999-17729

(51) Int. Cl.
*G02F 1/13* (2006.01)
*G02F 1/1337* (2006.01)

(52) U.S. Cl. ...................................... 349/187; 349/123
(58) Field of Classification Search ......... 349/187–192
See application file for complete search history.

(56) References Cited

U.S. PATENT DOCUMENTS 5,850,273 A * 12/1998 Terashita et al. ............ 349/129
5,853,818 A * 12/1998 Kwon et al. ................. 427/510
5,859,682 A * 1/1999 Kim et al. ................... 349/124
5,946,064 A * 8/1999 Lee ............................. 349/124
6,256,082 B1 * 7/2001 Suzuki et al. ............... 349/144
6,368,681 B1 * 4/2002 Ogawa ....................... 428/1.23
6,414,737 B1 * 7/2002 Reznikov et al. ............ 349/136
6,642,990 B1 * 11/2003 Fukushima et al. ......... 349/172
6,765,643 B1 * 7/2004 Fukushima et al. ......... 349/174
6,876,426 B1 * 4/2005 Fukushima et al. ......... 349/174

FOREIGN PATENT DOCUMENTS

KR 10-229198 8/1999

* cited by examiner

*Primary Examiner*—Frank G. Font
*Assistant Examiner*—Timothy L. Rude
(74) *Attorney, Agent, or Firm*—McKenna Long & Aldridge LLP

(57) ABSTRACT

A method of manufacturing a liquid crystal display device includes the steps of: providing a first substrate and a second substrate; forming a first alignment film on the first substrate; irradiating light to the first alignment film to obtain an acute angle of 0° or greater between an alignment direction of the first alignment film and a director of a liquid crystal molecule adjacent to the first alignment film; and forming a liquid crystal between the first substrate and the second substrate.

29 Claims, 3 Drawing Sheets

METHOD OF MANUFACTURING A LIQUID CRYSTAL DISPLAY DEVICE WITH COMPENSATION FOR ANGLE BETWEEN DIRECTOR AND ALIGNMENT DIRECTION

BACKGROUND OF THE INVENTION

1. Field of the Invention

The present invention relates to a liquid crystal display (LCD) device, and more particularly, to a method of manufacturing a liquid crystal display device in which alignment process is performed to obtain a desired twist angle.

2. Discussion of the Related Art

Generally, a twisted-nematic(TN)-LCD device used as a large area, high quality LCD device has a liquid crystal alignment film arranged inside a transparent electrode to directly adjoin liquid crystal molecules. On the interface between the liquid crystal alignment film and the liquid crystal molecules, the liquid crystal is aligned by a unidirectional alignment of the liquid crystal molecules and a pre-tilt angle of the liquid crystal alignment film and the liquid crystal molecules. The unidirectional alignment is performed in such a manner that the liquid crystal alignment film is stretched unidirectionally.

A related art rubbing method used to perform a unidirectional stretching process on the liquid crystal alignment film is performed in such a manner that a substrate coated with a high polymer is rubbed with a cloth. Since the related art rubbing method enables a large area and high speed process, it is industrially and widely used.

If the substrate is rubbed by the related art rubbing method, micro grooves are uniformly formed in the alignment film. The micro grooves are arranged in parallel to the liquid crystal molecules to minimize elastic deformation energy. However, in the related art rubbing method, types of the micro grooves formed in the alignment film are different according to the intensity of friction between an alignment cloth and the alignment film. Therefore, the liquid crystal molecules are unevenly arranged, thereby causing phase distortion and light scattering. The phase distortion and light scattering may significantly act on the performance of the LCD.

In the related art rubbing method, a value of a pre-tilt angle is susceptible to deposition or rubbing condition. Accordingly, to realize the related art rubbing method, sufficient consideration is required. Moreover, since the related art rubbing method is performed in such a manner that the high polymer film is rubbed with the alignment cloth, fine dust or electrostatic discharge (ESD) may occur. In other words, the dust causes serious problems in forming a high resolution pixel electrode or a thin film transistor (TFT) by repeatedly performing deposition, exposure and etching processes. Furthermore, local discharge may damage the alignment film, or cause short of a transparent electrode or the TFT, or destruct static electricity. Besides, the alignment film for TFT requires high voltage retention ratio capable of retaining charges for a long time.

Particularly, in the TN-LCD, light transmittivity is symmetrically distributed for a viewing angle in left and right direction, but asymmetrically distributed for a viewing angle in up and down direction. Image is shifted for the viewing angle in up and down direction, thereby causing the viewing angle to be narrowed.

To supplement anisotropic characteristic of the liquid crystal, a multi-domain TN-LCD such as a TDTN(two domain TN)-LCD and DDTN(domain divided TN) are provided. The process of the multi-domain TN-LCD is characterized by photolithography and rubbing. That is to say, to form domains within each pixel in opposite directions or different alignment directions, photolithography and rubbing processes are twice required. Furthermore, four-domain TN-LCD may be provided.

However, the multi-domain TN-LCD has several problems. That is, the two domain TN-LCD has a viewing angle of ±25° at most in up and down direction within the range of a contrast ratio of 10 or greater. The four domain TN-LCD has a viewing angle of ±40° at most in up and down direction and left and right direction. Moreover, the multi-domain TN-LCD has a complicated manufacturing process.

To solve the problems of the rubbing method, a photo-alignment method is provided. The photo-alignment method is based on a photo-polymerization of the alignment film by irradiation of light. In the photo-alignment method, the alignment direction is determined by irradiating ultraviolet rays two times.

Also, in the photo-alignment method, a PVCN(polyvinylclinnamate) based material is used as a photo-alignment film, and a pre-tilt direction on a surface of the alignment film is determined by irradiating ultraviolet rays to the alignment film vertically and slantingly. At this time, the pre-tilt angle of a surface of the alignment film is determined by varying the alignment film and an irradiation angle of the ultraviolet rays.

However, in case where the photo-alignment film has low isotropic characteristic and anchoring energy, the photo-alignment method has a problem. That is, the liquid crystal is implanted to the alignment film, a director of the liquid crystal molecule adjacent to the actual alignment film is not coincident with alignment direction. Accordingly, the alignment film has a twist angle different from a desired twist angle.

The difference between the director of the liquid crystal molecule intended in the alignment direction and the director of the actual liquid crystal molecule fails to obtain normally white mode or normally black mode and deteriorates contrast ratio.

SUMMARY OF THE INVENTION

Accordingly, the present invention is directed to a method of manufacturing a liquid crystal display device that substantially obviates one or more of the problems due to limitations and disadvantages of the related art.

An object of the present invention is to provide a method of manufacturing a liquid crystal display device in which an alignment film on at least one substrate is aligned to obtain an acute angle of 0° or greater between an alignment direction of the alignment film and an a director of a liquid crystal molecule adjacent to the alignment film.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a method of manufacturing a liquid crystal display device according to the present invention includes the steps of: providing a substrate; forming an alignment film on the substrate; and irradiating light to the alignment film to obtain an acute angle of 0° or greater between an alignment direction of the alignment film and a director of a liquid crystal molecule adjacent to the alignment film.

In another aspect, a method of manufacturing a liquid crystal display device includes the steps of: providing a first substrate and a second substrate; forming at least a first alignment film on the first substrate; irradiating light to the first alignment film to obtain an acute angle of 0° or greater between an alignment direction of the first alignment film and a director of a liquid crystal molecule adjacent to the first alignment film; and forming a liquid crystal between the first substrate and the second substrate, wherein the liquid crystal has a positive dielectric anisotropy or a negative dielectric anisotropy.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

A method of manufacturing a liquid crystal display device will be described with the accompanying drawings.

Figure 1:
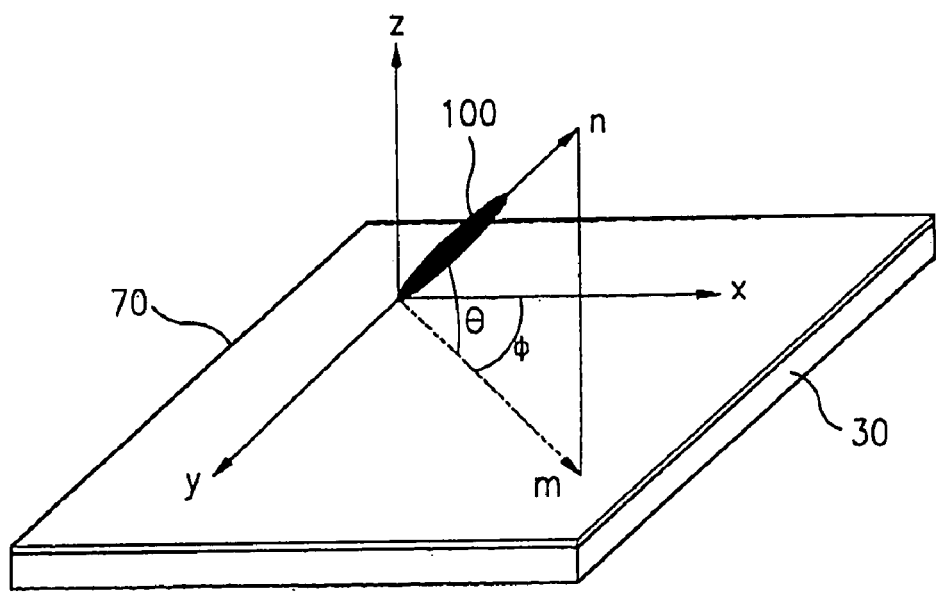
FIG. 1 shows alignment of liquid crystal molecules on an alignment film of a liquid crystal display device according to the present invention.

FIG. 1 shows alignment of liquid crystal molecules on an alignment film of a liquid crystal display device according to the present invention.

As shown in FIG. 1, it is assumed that a surface of an alignment film 70 on a substrate 30 is xy plane and one side of the substrate 30 is x axis. In this case, a director n̂ of a liquid crystal molecule 100 can be expressed by an easy axis direction or an alignment direction having an alignment angle $\Psi$ which is an azimuthal angle from x axis, and a pre-tilt angle $\theta$ which is a polar angle from xy plane.

In the present invention, it is intended that the alignment film is formed in the liquid crystal display device to have a desired twist angle so that optimal alignment is obtained in various modes. The alignment film is formed of a light reaction material and light is irradiated to determine an alignment direction of the alignment film. The alignment direction of the alignment film is controlled by irradiation direction of light and irradiation amount of light when irradiating light, i.e., characteristic(polarization) of light energy, irradiation wavelength, irradiation time, and irradiation intensity.

Figure 2:
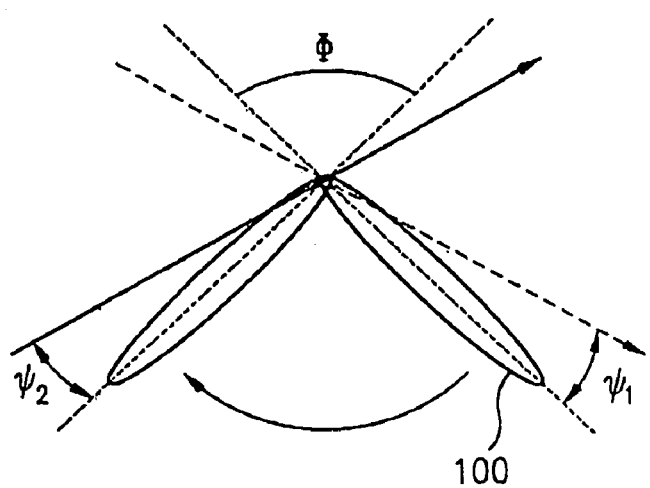
FIG. 2 shows an alignment direction of each alignment film and a twist angle of a liquid crystal molecule adjacent to each alignment film if a left-handed liquid crystal is used in the alignment film of a liquid crystal display device according to the present invention.
Figure 3:
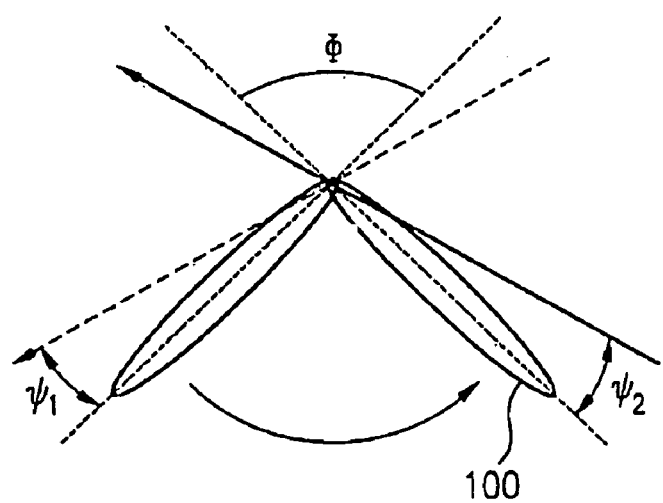
FIG. 3 shows an alignment direction of each alignment film and a twist angle of a liquid crystal molecule adjacent to each alignment film if a right-handed liquid crystal is used in the alignment film of a liquid crystal display device according to the present invention.

FIG. 2 shows an alignment direction of each alignment film and a twist angle of a liquid crystal molecule adjacent to each alignment film if a left-handed liquid crystal is used in the alignment film of a liquid crystal display device according to the present invention, and FIG. 3 shows an alignment direction of each alignment film and a twist angle of a liquid crystal molecule adjacent to each alignment film if a right-handed liquid crystal is used in the alignment film of a liquid crystal display device according to the present invention.

In FIGS. 2 and 3, a solid dotted line arrow denotes an alignment direction of a first alignment film, a solid line arrow denotes an alignment direction of a second alignment film, and a dotted line denotes a director of a liquid crystal molecule adjacent to each alignment film.

In the liquid crystal display device of the present invention, first and second alignment films are formed of photosensitive materials on first and second substrates. Then, light is irradiated to each alignment film to induce a desired liquid crystal alignment, that is, alignment direction. The alignment direction is determined according to light irradiation to induce a desired direction in the first and second alignment films.

Subsequently, if the liquid crystal is injected between the first and second substrates, the liquid crystal molecule adjacent to surfaces of the first and second alignment films is orientated with a predetermined tilted alignment, homeotropic alignment or homogeneous alignment according to alignment direction of the first and second alignment films. At this time, the liquid crystal molecule is aligned deviated from the alignment direction of the alignment film except parallel or anti-parallel alignment. In other words, the director of the liquid crystal molecule adjacent to the first alignment film is deviated by $\Psi_1$ from the alignment direction of the first alignment film while the director of the liquid crystal molecule adjacent to the second alignment film is deviated by $\Psi_2$ from the alignment direction of the second alignment film.

$\Psi_1$ and $\Psi_2$ denote deviation angles which indicate deviation degree from the alignment direction induced to the first and second alignment films by the directors of the liquid crystal molecules adjacent to the first and second alignment films. An angle between the directors of the liquid crystal molecule adjacent to the first alignment film and the director of the liquid crystal molecule adjacent to the second alignment film is defined as a twist angle $\Phi$. In other words, an angle obtained by the directors of the liquid crystal molecules induced from the alignment direction of the first and second alignment films becomes a desired twist angle.

Figure 4:
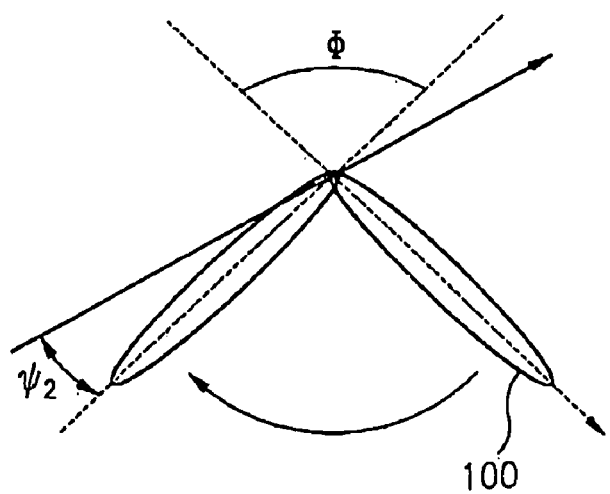
FIG. 4 shows an alignment direction of each alignment film and a twist angle of a liquid crystal molecule adjacent to each alignment film if alignment films having different anchoring energies are formed in a liquid crystal display device according to the present invention.

FIG. 4 shows an alignment direction of each alignment film and a twist angle of a liquid crystal molecule adjacent to each alignment film if alignment films having different anchoring energies are formed in a liquid crystal display device according to the present invention.

The first alignment film is formed of a material having a surface anchoring energy greater than the second alignment film. Therefore, the alignment direction of the first alignment film is almost coincident with the director of the liquid crystal molecule adjacent to the first alignment film. In this case, as shown in FIGS. 2 and 3, the alignment direction of the second alignment film has a deviation angle $\Psi_2$ with the director of the liquid crystal molecule, so that a desired twist angle $\Phi$ can be obtained.

Figure 5:
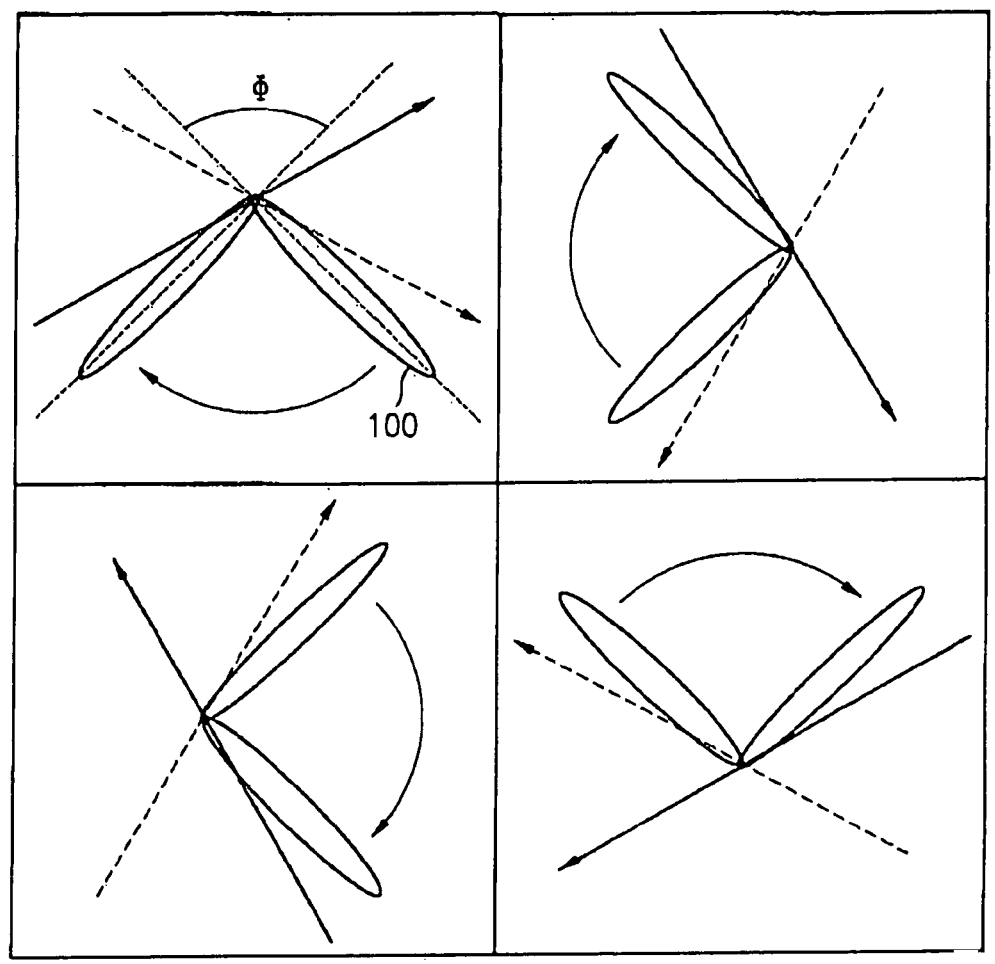
FIG. 5 shows an alignment direction of each alignment film and a twist angle of a liquid crystal molecule adjacent to each alignment film if a multi-domain is formed in the alignment film of a liquid crystal display device according to the present invention.

FIG. 5 shows an alignment direction of each alignment film and a twist angle of a liquid crystal molecule adjacent to each alignment film if a multi-domain is formed in the alignment film of a liquid crystal display device according to the present invention. In this embodiment, a domain is divided within one pixel and alignment process is performed so that each domain has a desired twist angle, thereby obtaining an improved viewing angle.

Therefore, in the present invention, the alignment process is performed by controlling a light energy to obtain a desired twist angle according to a surface anchoring energy of the alignment film. Thus, even a low driving voltage facilitates the liquid crystal alignment. Particularly, a desirable effect can be expected in the TN LCD among various modes of the LCDs.

Irradiation of light used in the method of manufacturing a liquid crystal display device according to the present invention ensures alignment direction, pre-tilt angle and alignment stabilization of the liquid crystal by irradiating light at least one time. Ultraviolet rays or light in a visible ray area are suitable for the photo-alignment. Non-polarized light, linear polarized light or partially polarized light may be used.

The alignment film is formed of cellulosecinnamate (CelCN), polyvinylcinnamate(PVCN), polysiloxanecinnamate(PSCN), or the like. The alignment film is divided into at least two areas so that the liquid crystal molecules of the liquid crystal layer are differently aligned on each area.

At this time, the alignment films of upper and lower substrates are formed of the same materials as each other so that photo-alignment is performed. One of the upper and lower substrates may be aligned as above and the other may not be aligned.

Moreover, in the liquid crystal display device of the present invention, homogeneous alignment or homeotropic alignment is possible. The homogeneous alignment is aligned so that the director of the liquid crystal molecule constituting the liquid crystal layer is in parallel to the surfaces of the upper and lower substrates. The homeotropic alignment is aligned so that the director of the liquid crystal molecule is in vertical to the surfaces of the upper and lower substrates. Furthermore, in the liquid crystal display device of the present invention, a tilted alignment, a twisted alignment, a hybrid alignment or an in-plane switching mode alignment is possible. The tilted alignment is aligned at a predetermined angle with respect to the surface of the upper substrate or the lower substrate. The twisted alignment is aligned in a twisted form. The hybrid alignment is aligned in parallel to one surface of the upper substrate and the lower substrate but vertical to the other surface.

The liquid crystal display device of the present invention may be formed of a multi-domain liquid crystal display device such as a two-domain liquid crystal display device or a four-domain liquid crystal display device by dividing the alignment film of the upper substrate and/or the alignment film of the lower substrate into two or more areas.

As aforementioned, the method of manufacturing a liquid crystal display device has the following advantages.

The alignment film on at least one substrate is aligned to obtain an acute angle of 0° or greater between the alignment direction of the alignment film and the director of the liquid crystal molecule adjacent to the alignment film. Thus, a desired twist angle is obtained, thereby obtaining an improved contrast ratio and viewing angle.

Furthermore, since the liquid crystal display device of the present invention facilitates alignment division and realizes gray scale at a low driving voltage without deteriorating display quality, it is easily applicable to various modes.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of manufacturing a liquid crystal display device comprising:
   providing a substrate;
   forming an alignment film on the substrate; and
   irradiating light to the alignment film to form an acute angle of greater than 0° between an alignment direction of the alignment film and a director of liquid crystal molecule adjacent to the alignment film, wherein the degree of the acute angle is determined based on a desired twist angle of the liquid crystal molecule as a non-zero angle;
   wherein the irradiating light to the alignment film includes compensating a difference between the director of the liquid crystal molecule intended in the alignment direction and the director of the actual liquid crystal molecule.

2. The method of manufacturing a liquid crystal display device as claimed in claim 1, wherein the alignment direction of the alignment film depends on a twist angle of the liquid crystal display device.

3. The method of manufacturing a liquid crystal display device as claimed in claim 1, wherein the alignment film includes a material selected from the group consisting of cellulosecinnamate (CelCN), polyvinylcinnamate (PVCN), and polysiloxanecinnamate (PSCN).

4. The method of manufacturing a liquid crystal display device as claimed in claim 1, wherein the alignment film is divided into at least two areas so that the liquid crystal molecule has different alignment characteristics on each area.

5. The method of manufacturing a liquid crystal display device as claimed in claim 1, wherein the light is irradiated at least one time.

6. The method of manufacturing a liquid crystal display device as claimed in claim 1, wherein the light includes an ultraviolet light.

7. The method of manufacturing a liquid crystal display device as claimed in claim 1, wherein the light includes visible light.

8. A method of manufacturing a liquid crystal display device comprising:
   providing a first substrate and a second substrate;
   forming at least a first alignment film on the first substrate;
   irradiating light to the first alignment film to obtain an acute angle of greater than 0° between an alignment direction of the first alignment film and a director of a liquid crystal molecule adjacent to the first alignment film; and
   forming a liquid crystal between the first substrate and the second substrate, wherein the degree of the acute angle is determined based on a desired twist angle of the liquid crystal molecule as a non-zero angle;

wherein the irradiating light to the alignment film includes compensating a difference between the director of the liquid crystal molecule intended in the alignment direction and the director of the actual liquid crystal molecule.

9. The method of manufacturing a liquid crystal display device as claimed in claim 8, further comprising the step of forming a second alignment film on the second substrate.

10. The method of manufacturing a liquid crystal display device as claimed in claim 9, further comprising the step of irradiating light to the second alignment film to obtain an acute angle between an alignment direction of the second alignment film and a director of a liquid crystal molecule adjacent to the second alignment film.

11. The method of manufacturing a liquid crystal display device as claimed in claim 10, wherein the alignment direction of the second alignment film depends on a twist angle of the liquid crystal display device.

12. The method of manufacturing a liquid crystal display device as claimed in claim 8, wherein the first alignment film or the second alignment film includes a material selected from the group consisting of cellulosecinnamate (CelCN), polyvinylcinnamate (PVCN), and polysiloxanecinnamate (PSCN).

13. The method of manufacturing a liquid crystal display device as claimed in claim 9, wherein the first alignment film or the second alignment film is divided into at least two areas so that the liquid crystal molecule has different alignment characteristics on each area.

14. The method of manufacturing a liquid crystal display device as claimed in claim 10, wherein the light is irradiated at least one time.

15. The method of manufacturing a liquid crystal display device as claimed in claim 10, wherein the light includes an ultraviolet light.

16. The method of manufacturing a liquid crystal display device as claimed in claim 10, wherein the light includes visible light.

17. The method of manufacturing a liquid crystal display device as claimed in claim 8, wherein the liquid crystal has a positive dielectric anisotropy.

18. The method of manufacturing a liquid crystal display device as claimed in claim 8, wherein the liquid crystal is tilt-aligned with respect to a surface of the first substrate or the second substrate.

19. The method of manufacturing a liquid crystal display device as claimed in claim 8, wherein the liquid crystal is twist-aligned with respect to a surface of the first substrate or the second substrate.

20. A method of manufacturing a liquid crystal display device comprising:
providing a first substrate and a second substrate;
forming at least a first alignment film on the first substrate;
irradiating light to the first alignment film to obtain an acute angle of greater than 0° between an alignment direction of the first alignment film and a director of a liquid crystal molecule adjacent to the first alignment film; and
forming a liquid crystal between the first substrate and the second substrate;
wherein the liquid crystal has a negative dielectric anisotropy and the degree of the acute angle is determined based on a desired twist angle of the liquid crystal molecule as a non-zero angle;
wherein the irradiating light to the alignment film includes compensating a difference between the director of the liquid crystal molecule intended in the alignment direction and the director of the actual liquid crystal molecule.

21. A method of manufacturing a liquid crystal display device comprising:
providing a first substrate and a second substrate;
forming at least a first alignment film on the first substrate;
irradiating light to the first alignment film to obtain an acute angle of greater than 0° between an alignment direction of the first alignment film and a director of a liquid crystal molecule adjacent to the first alignment film; and
forming a liquid crystal between the first substrate and the second substrate;
wherein the liquid crystal is aligned in parallel to a surface of the first substrate or the second substrate and the degree of the acute angle is determined based on a desired twist angle of the liquid crystal molecule as a non-zero angle;
wherein the irradiating light to the alignment film includes compensating a difference between the director of the liquid crystal molecule intended in the alignment direction and the director of the actual liquid crystal molecule.

22. A method of manufacturing a liquid crystal display device comprising:
providing a first substrate and a second substrate;
forming at least a first alignment film on the first substrate;
irradiating light to the first alignment film to obtain an acute angle of greater than 0° between an alignment direction of the first alignment film and a director of a liquid crystal molecule adjacent to the first alignment film; and
forming a liquid crystal between the first substrate and the second substrate;
wherein the liquid crystal is aligned in vertical to a surface of the first substrate or the second substrate and the degree of the acute angle is determined based on a desired twist angle of the liquid crystal molecule as a non-zero angle;
wherein the irradiating light to the alignment film includes compensating a difference between the director of the liquid crystal molecule intended in the alignment direction and the director of the actual liquid crystal molecule.

23. A method of manufacturing a liquid crystal display device, comprising:
forming a first alignment film on a first substrate, wherein the first alignment film has a first surface anchoring energy, wherein a director of a liquid crystal molecule adjacent to the first alignment film deviates from an alignment direction of the first alignment film;
forming a second alignment film on a second substrate, wherein the second alignment film has a second surface anchoring energy, wherein the second surface anchoring energy is less than the first surface anchoring energy; and
forming a liquid crystal between the first and second alignment films, wherein a degree of the deviation from the alignment direction is determined based on a desired twist angle of the liquid crystal molecule as a non-zero angle;
wherein the irradiating light to the alignment film includes compensating a difference between the director of the liquid crystal molecule intended in the alignment direction and the director of the actual liquid crystal molecule.

24. The method of manufacturing a liquid crystal display device as claimed in claim 23, wherein the director of the liquid crystal molecule adjacent to the first alignment film forms an acute angle with an alignment direction of the first alignment film.

25. The method of manufacturing a liquid crystal display device as claimed in claim 23, wherein a director of a liquid crystal molecule adjacent to the second alignment film deviates from an alignment direction of the second alignment film.

26. The method of manufacturing a liquid crystal display device as claimed in claim 25, wherein the director of the liquid crystal molecule adjacent to the second alignment film forms an acute angle with an alignment direction of the second alignment film.

27. A method of manufacturing a liquid crystal display device, comprising:
   forming a first alignment film on a first substrate;
   irradiating light to the first alignment film to form a first alignment direction;
   forming a liquid crystal on the first alignment film, wherein a director of a liquid crystal molecule adjacent to the first alignment film forms a non-zero angle with the alignment direction of the alignment film, wherein the degree of the non-zero angle is determined based on a desired twist angle of the liquid crystal molecule as a non-zero angle;
   wherein the irradiating light to the alignment film includes compensating a difference between the director of the liquid crystal molecule intended in the alignment direction and the director of the actual liquid crystal molecule.

28. The method of manufacturing a liquid crystal display device as claimed in claim 27, wherein the non-zero angle is an acute angle.

29. A method of manufacturing a liquid crystal display device comprising:
   providing a first substrate and a second substrate;
   forming at least a first alignment film on the first substrate;
   irradiating light to the first alignment film to obtain an acute angle of greater than 0° between an alignment direction of the first alignment film and a director of a liquid crystal molecule adjacent to the first alignment film; and
   forming a liquid crystal between the first substrate and the second substrate;
   wherein the liquid crystal is parallel to a surface of the first substrate and the second substrate and in vertical to the other surface and the degree of the acute angle is determined based on a desired twist angle of the liquid crystal molecule as a non-zero angle;
   wherein the irradiating light to the alignment film includes compensating a difference between the director of the liquid crystal molecule intended in the alignment direction and the director of the actual liquid crystal molecule.

* * * * *